United States Patent [19]

Yamamoto et al.

[11] Patent Number: 5,175,059
[45] Date of Patent: Dec. 29, 1992

[54] SYNTHETIC RESIN MOLDED ARTICLE HAVING GOOD ANTISTATIC PROPERTY AND PROCESS FOR PREPARATION THEREOF

[75] Inventors: Naoki Yamamoto; Hiroki Hatakeyama, both of Otake, Japan

[73] Assignee: Mitsubishi Rayon Company Ltd., Tokyo, Japan

[21] Appl. No.: 883,294

[22] Filed: May 14, 1992

Related U.S. Application Data

[62] Division of Ser. No. 578,183, Sep. 6, 1990.

[51] Int. Cl.$^5$ ............................................. B32B 27/08
[52] U.S. Cl. ........................................ 428/520; 428/412; 428/424.4; 428/451; 428/476.3; 428/483
[58] Field of Search ................ 428/520, 922; 260/171

[56] References Cited

U.S. PATENT DOCUMENTS

| | | | |
|---|---|---|---|
| 2,897,170 | 7/1959 | Gruber | 428/922 |
| 4,104,175 | 8/1978 | Martinsson et al. | 428/922 |
| 4,241,144 | 12/1980 | Hendy | 428/520 |
| 4,299,748 | 11/1981 | Hashizume et al. | 524/519 |
| 4,371,489 | 2/1983 | McGrail | 264/171 |
| 4,877,687 | 10/1989 | Azegami et al. | 264/266 |
| 5,093,205 | 3/1992 | Yamamoto et al. | 428/520 |
| 5,096,761 | 3/1992 | Roberts et al. | 428/922 |

FOREIGN PATENT DOCUMENTS 263985 4/1988 European Pat. Off.
2412597 7/1979 France.

*Primary Examiner*—P. C. Sluby
*Attorney, Agent, or Firm*—Oblon, Spivak, McClelland, Maier & Neustadt

[57] ABSTRACT

A synthetic resin molded article having a good antistatic property, includes a synthetic resin substrate and a film of an antistatic polymer formed on the surface of the substrate. The antistatic polymer is prepared by polymerizing an anionic monomer represented by the formula (I) or a mixture of the anionic monomer and a monomer copolymerizable therewith:

$$CH_2=\overset{R_1}{\underset{|}{C}}-A_1-SO_3^-X^+R_2R_3R_4R_5 \quad (I)$$

wherein $R_1$ is H or $-CH_3$, $A_1$ is $$-(CH_2)_n-, \quad -\underset{\underset{O}{\|}}{C}-O-B-, \quad -\underset{\underset{O}{\|}}{\overset{}{C}}-\underset{\underset{R_6}{|}}{N}-B-$$

or phenylene, X is N or P, $R_2$, $R_3$, $R_4$ and $R_5$ independently represent an alkyl, aryl or aralkyl group which may have a substituent, n is 0, 1 or 2, B is an alkylene, arylene or aralkylene group which may have an ester bond, and $R_6$ is H or an alkyl group.

10 Claims, 1 Drawing Sheet

SYNTHETIC RESIN MOLDED ARTICLE HAVING GOOD ANTISTATIC PROPERTY AND PROCESS FOR PREPARATION THEREOF

This is a division of application Ser. No. 07/578,183, filed on Sep. 6, 1990, now pending.

BACKGROUND OF THE INVENTION (1) Field of the Invention

The present invention relates to a synthetic resin molded article having a good and durable antistatic property and a process for the preparation thereof.

(2) Description of the Related Art

At the present, many synthetic resin molded articles having many good properties are marketed, but since they generally have a high electric resistance and are easily charged with electricity by friction or the like, they attract dust and dirt, and thus the appearance thereof becomes poor.

As the means for imparting an antistatic property to synthetic resin molded articles, there can be mentioned (1) internal addition of a surface active agent, (2) surface coating with a surface active agent, (3) surface coating with a silicon compound and (4) surface modification by a plasma treatment. Of these methods, methods (3) and (4) are not practical because of the high cost thereof, and methods (1) and (2) are generally adopted.

In the method of the internal addition of a surface active agent, since a surface active agent is incorporated or dispersed in a synthetic resin-forming starting material before the polymerization or a synthetic resin before the molding, the preparation steps can be simplified, but to obtain a required antistatic property, it is generally necessary to increase the amount of a surface active agent. This increase of the amount of the surface active agent added, however, tends to result in a lowering of the mechanical strength of the synthetic resin, and the obtained antistatic property is easily lost when washed with water or by rubbing.

The method of coating the surface with a surface active agent is advantageous in that the physical properties of the synthetic resin as the substrate are not lowered and a good antistatic property can be obtained with a small amount of the surface active agent. On the other hand, since the surface-coating step is necessary, an additional cost is required, and there is a danger that the beautiful appearance inherently possessed by a synthetic resin molded article will be lost. Moreover, the method has a problem in that the obtained antistatic property is easily lost by water washing or rubbing.

The inventors previously disclosed a cationic antistatic polymer having a quaternary ammonium base therein in Japanese Unexamined Patent Publication No. 63-108040, but this cationic polymer has a poor heat stability, and thus the polymer is adversely affected by heat.

SUMMARY OF THE INVENTION

In view of the foregoing, a primary object of the present invention to provide a synthetic resin molded article having a good and durable antistatic property and retaining the inherent physical properties of the synthetic resin.

The inventors carried out research with a view to achieve the above object, and as a result found that, by forming a film of a specific anionic polymer on the molding surface of a casting mold and polymerizing a synthetic resin-forming starting material for a synthetic resin substrate by using this casting mold, a synthetic resin molded article having a good and durable antistatic property is obtained.

More specifically, in accordance with the present invention, there is provided a synthetic resin molded article having a good antistatic property, which comprises a synthetic resin substrate and a film of an antistatic polymer formed on the surface of the synthetic resin substrate, said antistatic polymer being formed by polymerizing an anionic monomer represented by the following general formula (I) or a mixture comprising at least 20% by weight of said anionic monomer and up to 80% by weight of at least one monomer copolymerizable therewith:

$$CH_2=\overset{R_1}{\underset{|}{C}}-A_1-SO_3^-X^+R_2R_3R_4R_5 \qquad (I)$$

wherein $R_1$ represents a hydrogen atom or a methyl group, $A_1$ represents

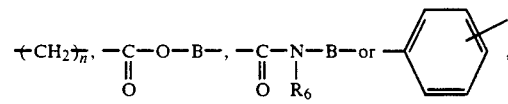

X represents a nitrogen atom or a phosphorus atom, $R_2$, $R_3$, $R_4$ and $R_5$ independently represent an alkyl, aryl or aralkyl group having 1 to 18 carbon atoms which may have a substituent, n is 0, 1 or 2, B represents an alkylene, arylene or aralkylene group having 1 to 18 carbon atoms which may have an ester bond, and $R_6$ represents a hydrogen atom or an alkyl group having 1 to 5 carbon atoms.

This molded article can be prepared by forming a film of the antistatic polymer on the molding surface of a casting mold by polymerizing the above-mentioned monomer or monomer mixture, casting a synthetic resin-forming starting material for the synthetic resin substrate into the casting mold, polymerizing and curing the starting material to transfer the film to onto the synthetic resin substrate from the mold surface and withdrawing the obtained molded article from the casting mold.

The anionic antistatic polymer has a good heat stability, and little deterioration of the polymer occurs at the polymerizing and curing step and heat processing step where the temperature is elevated, and from this viewpoint, the anionic antistatic polymer is advantageous over cationic antistatic polymers.

BRIEF DESCRIPTION OF THE DRAWING

The drawing illustrates an embodiment of the apparatus for the continuous preparation of the synthetic resin molded article of the invention in the form of a methacrylic resin plate, which apparatus is provided with a film-forming starting material-coating device.

DESCRIPTION OF THE PREFERRED EMBODIMENTS

Figure 1:
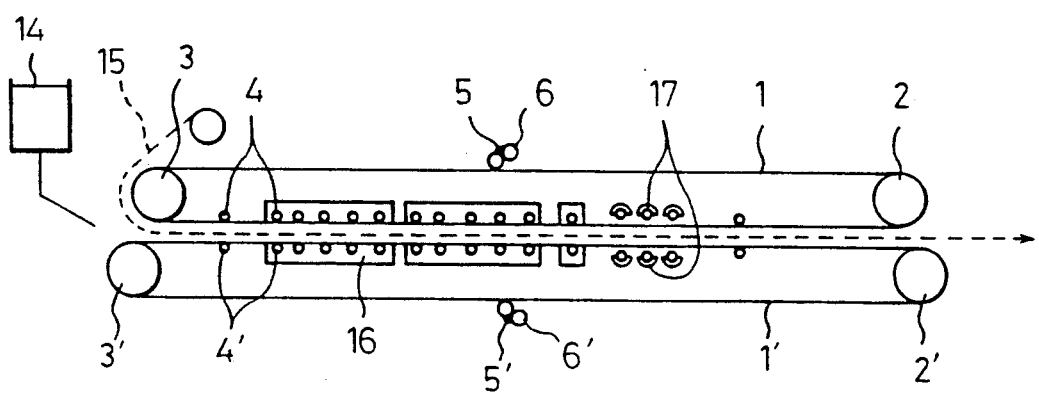

The anionic monomer used in the present invention is represented by the following general formula (I):

As specific examples of the anionic monomer of general formula (I), there can be mentioned tetramethylammonium vinylsulfonate, benzyltrimethylammonium vinylsulfonate, tetraethylammonium allylsulfonate, benzyltriethylammonium methallylsulfonate, methyltriethylolammonium sulfoethylmethacrylate, lauryltrimethylammonium sulfoethylacrylate, tetramethylammonium 2-acrylamido-2-methylpropanesulfonate, methyltriethylammonium 2-methacrylamido-2-methylpropanesulfonate, methyltriethylolammonium styrenesulfonate/ethylene oxide adduct, tetrabutylammonium α-methylstyrenesulfonate, tetraethylphosphonium vinylsulfonate, tetrabutylphosphonium vinylsulfonate, tetramethylolphosphonium vinylsulfonate, tetrabutylphosphonium allylsulfonate, tetralaurylphosphonium methallylsulfonate, tributylmethylphosphonium sulfoethylmethacrylate, triethylbutylphosphonium sulfoethylacrylate, tetrabutylphosphonium sulfopropylacrylamide, trimethylolbutylphosphonium sulfopropylmethacrylamide, tetrabutylphosphonium styrenesulfonate, tetramethylolphosphonium styrenesulfonate and triethylmethylphosphonium α-methylstyrenesulfonate.

Among these anionic monomers, an appropriate monomer is freely selected according to the kind of the synthetic resin substrate used. For example, when a methyl methacrylate resin is used as the synthetic resin substrate, in view of the compatibility with the methyl methacrylate resin and the easy availability of the starting material, ammonium salts of 2-acrylamido-2-methylpropanesulfonic acid, sulfoethylmethacrylic acid and sulfoethylacrylic acid are preferably used, and tetramethylammonium salts thereof are especially preferably used.

A monomer of general formula (I), in which at least one of $R_2$ through $R_5$ is a hydrogen atom, is not preferable because the resistance against thermal deterioration is lowered and discoloration occurs at the polymerizing and curing step and heat processing step at which the temperature is elevated, and the compatibility with the substrate synthetic resin and the adhesion to the synthetic resin substrate are reduced.

A known monomer can be used as the monomer copolymerizable with the anionic monomer of general formula (I). For example, there can be mentioned methacrylic acid esters such as methyl methacrylate and ethyl methacrylate, acrylic acid esters such as methyl acrylate and ethyl acrylate, unsaturated carboxylic acids such as acrylic acid and methacrylic acid, acid anhydrides such as maleic anhydride and itaconic anhydride, maleimide derivatives such as N-phenylmaleimide, hydroxyl group-containing monomers 2-hydroxyethyl acrylate and 2-hydroxypropyl methacrylate, nitrogen-containing monomers such as acrylamide and acrylonitrile, epoxy group-containing monomers such as allyl glycidyl ether and glycidyl acrylate, bifunctional monomers such as allyl methacrylate and allyl acrylate, and polymeric monomers such as methacrylate-terminated polymethyl methacrylate, styryl-terminated polymethyl methacrylate, methacrylate-terminated polystyrene, methacrylate-terminated polyethylene glycol and methacrylate-terminated acrylonitrile/styrene copolymer.

As the copolymerizable monomer, there are preferably used compounds represented by the following general formula (II):

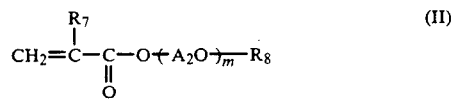

wherein $R_7$ represents a hydrogen atom or a methyl aralkyl or aryl group having 1 to 18 carbon atoms, which has no copolymerizable functional group, $A_2$ represents an alkylene group having 2 to 4 carbon atoms, and m is an integer of from 0 to 500, and copolymerizable compounds having at least two unsaturated double bonds. Especially preferably, at least two compounds selected from the foregoing two types are used in combination.

As the compound of general formula (II) in which m is 0, there can be mentioned methyl acrylate, ethyl acrylate, methyl methacrylate, ethyl methacrylate, butyl methacrylate, lauryl methacrylate, 2-ethylhexyl methacrylate, stearyl methacrylate, benzyl methacrylate, phenyl methacrylate, cyclohexyl methacrylate and 2-hydroxyethyl methacrylate.

As the compound of general formula (II) in which m is from 2 to 500, there can be mentioned polyethylene glycol(4) monomethacrylate, polyethylene glycol(23) monoacrylate, polyethylene glycol(23) monomethacrylate, polyethylene glycol(300) monomethacrylate, polypropylene glycol(23) monomethacrylate, polybutylene glycol(23) monomethacrylate, polyethylene glycol(23) monomethacrylate monomethyl ether, polyethylene glycol(23) monomethacrylate monobutyl ether, polyethylene glycol(23) monomethacrylate monostearyl ether, polyethylene glycol(23) monomethacrylate monophenyl ether, polyethylene glycol(23) monomethacrylate monobenzyl ether and polyethylene glycol(23) monomethacrylate mono-oleyl ether. Note, each parenthesized value indicates the number of alkylene glycol units in the polyalkylene glycol.

In view of the adhesion between the antistatic property-imparting copolymer and the synthetic resin substrate, the copolymerizable monomer is preferably the same as the monomer constituting the substrate synthetic resin, or a monomer forming a synthetic resin having a good compatibility with the synthetic resin substrate.

For example, when the synthetic resin substrate is a polymer comprising methyl methacrylate as the main component, if a monomer of general formula (II) in which m is 0 is used, a good adhesion is obtained between the synthetic resin substrate and the antistatic property-imparting copolymer. Therefore, in this case, the film of the antistatic property-imparting copolymer is not left in the casting mold at the time of peeling, and a stable antistatic property can be manifested regardless of kind of the casting mold used. If a monomer of general formula (II) in which m is from 2 to 500 is used, the release property of the synthetic resin molded article from the casting mold, especially the release property at a high temperature, is improved, and an antistatic synthetic resin molded article can be stably obtained.

As the copolymerizable monomer having at least two unsaturated double bonds, there can be mentioned allyl acrylate, methallyl acrylate, vinyl acrylate, allyl methacrylate, methallyl methacrylate, vinyl methacrylate, 1-chlorovinyl methacrylate, isopropenyl methacrylate, N-methacryloxymaleimide, ethylene glycol dimethacrylate, butanediol dimethacrylate, polyethylene glycol dimethacrylate, allyl vinyl ether, allyl vinyl ketone, trimethylolpropane trimethacrylate, pentaerythritol tetramethacrylate and triallyl cyanurate.

When the copolymerizable compound having at least two unsaturated double bonds is used, the copolymer film of the present invention has a crosslinked portion and a residual double bond, which contribute to an improvement of the strength of the film per se, formation of a semi-IPN structure of the synthetic resin substrate and formation of a chemical bonding to the substrate by graft polymerization of the monomer to the residual double bonding, and a result, the surface hardness of the molded article and the adhesion of the copolymer film to the synthetic resin substrate, i.e., the durable antistatic property, can be improved.

Especially, when one of the functional groups is a functional group having a polymerizability lower than that of the methacryloyl group or acryloyl group, such as an allyl group, a methallyl group, a vinylidene group or a vinylene group, an unreacted double bond is left in the polymeric antistatic agent and performs a graft polymerization during the polymerization for the synthetic resin substrates, and therefore, a good adhesion is obtained between the film of the antistatic property-imparting polymer and the synthetic resin substrate.

As the monomer copolymerizable with the anionic monomer represented by general formula (I), when the synthetic resin substrate is a methyl methacrylate polymer, there is preferably used a combination of (a) a compound of general formula (II) in which m is from 2 to 500, (b) a compound of general formula (II) in which m is 0, especially methyl methacrylate, and (c) a copolymerizable compound having at least two unsaturated double bonds, especially allyl methacrylate or allyl acrylate.

The antistatic polymer of the present invention comprises 20 to 100% by weight, preferably 20 to 80% by weight, of units derived from an anionic monomer represented by general formula (I), and 0 to 80% by weight, preferably 20 to 80% by weight, of units derived from a copolymerizable monomer. If the amount of the anionic monomer of general formula (I) is smaller than 20% by weight, a good antistatic property cannot be given to an obtained synthetic resin molded article, for example, a methacrylic resin cast plate. From the viewpoint of the adhesion of the antistatic polymer to the synthetic resin substrate, the copolymerizable monomer other than the monomer of general formula (I) is preferably used in an amount of at least 20% by weight.

When the synthetic resin substrate is a methyl methacrylate resin, an antistatic polymer comprising 20 to 70% by weight of units derived from an anionic monomer of the general formula (I), and as the copolymerizable monomer, (a) 24.9 to 74.9% by weight of units derived from a monomer of general formula (II) in which m is from 2 to 500, (b) 5 to 55% by weight of units derived from a monomer of the general formula (II) in which m is 0 and (c) 0.1 to 10% by weight of units derived from a copolymerizable compound having at least two unsaturated double bonds, is especially preferably used.

Preferably, the molecular weight of the antistatic polymer used in the present invention is at least 1,000. If the molecular weight of the antistatic polymer is lower than 1,000, a film having a good and durable antistatic performance is difficult to obtain.

A durable antistatic property is attained according to the present invention because the film of the antistatic polymer is integrated with the synthetic resin substrate. More specifically, the film formed on the surface of the casting molding is swollen with a synthetic resin-forming starting material at the polymerization for the synthetic resin substrate, and in this state, the polymerization is advanced and the film is integrated with the as-polymerized surface portion of the molded article obtained according to the present invention, the antistatic property thereof is not lowered, when washed with water or by rubbing and the molded article of the present invention is advantageous in this point over a product obtained according to the coating method using a surface active agent. Moreover, according to the present invention, since the film of the antistatic polymer is present only on the surface of the molded article, a good antistatic performance can be obtained even with a small amount of the antistatic polymer.

The starting material used for the synthetic resin substrate is not particularly critical. For example, there can be mentioned methyl methacrylate, styrene and other polymerizable monomer, partial polymerization products thereof, a polyol and a polyisocyanate, an oligomer having epoxy groups at both the terminals and a polyamine or polyamide, an unsaturated polyester, a novolak polymer and a bisoxadorine, a reactive silicone rubber oligomer, and a polycarbonate cyclic oligomer.

A methacrylic resin prepared from methyl methacrylate, a monomer mixture comprising at least 50% by weight of methyl methacrylate and up to 50% by weight of at least one monomer copolymerizable therewith, or a partial polymerization product thereof is most preferably used as the synthetic resin substrate.

As the monomer copolymerizable with methyl methacrylate, there can be mentioned methacrylic acid esters such as ethyl methacrylate, butyl methacrylate and 2-ethylhexyl methacrylate, acrylic acid esters such as methyl acrylate, ethyl acrylate, butyl acrylate and 2-ethylhexyl acrylate, unsaturated carboxylic acids such as acrylic acid, methacrylic acid, maleic acid and itaconic acid, acid anhydrides such as maleic anhydride and itaconic anhydride, maleimide derivatives such as N-phenylmaleimide, N-cyclohexylmaleimide and N-t-butylmaleimide, hydroxyl group-containing monomers such as 2-hydroxyethyl acrylate, 2-hydroxypropyl acrylate, 2-hydroxyethyl methacrylate and 2-hydroxypropyl methacrylate, nitrogen-containing monomers such as acrylamide, methacrylamide, acrylonitrile, methacrylonitrile, diacetone acrylamide and dimethylaminoethyl methacrylate, epoxy group-containing monomers such as allyl glycidyl ether, glycidyl acrylate and glycidyl methacrylate, styrene monomers such as styrene and α-methylstyrene, and crosslinking agents such as ethylene glycol diacrylate, allyl acrylate, ethylene glycol dimethacrylate, allyl methacrylate, divinylbenzene and trimethylolpropane triacrylate, although the copolymerizable monomers that can be used are not limited to those exemplified above. The kind and amount of the copolymerizable monomer added are determined according to the intended synthetic resin molded article.

Additives such as colorants, release agents, ultraviolet absorbers, heat stabilizers and various fillers can be incorporated in the starting material for the synthetic resin substrate used in the present invention.

As examples of the casting mold used in the present invention, there can be mentioned those made of inorganic glasses such as tempered glass, metals such as stainless steel, aluminum and a chromium plated metal, and resins such as a polyester resin. The surface of the casting mold is generally a mirror-polished surface, but a surface which has been subjected to a delustering treatment by forming fine undulations on the surface can be used according to the intended object.

A method in which a solution of the copolymer in water and/or an organic solvent is coated on the casting mold surface is a simple and advantageous method for the formation of a film of the copolymer on the surface of the casting mold. When the synthetic resin substrate is a methacrylic resin, in view of the adhesion to the synthetic resin substrate and the spreading of the solvent, there is especially preferably used a method in which methyl methacrylate or a mixture comprising 50% by weight of methyl methacrylate and up to 50% by weight of a monoethylenically unsaturated monomer copolymerizable therewith, or a partial polymerization product thereof, is coated on the surface of the casting mold.

Additive components such as release agents, defoaming agents, levelling agents, monomers and crosslinking agents can be incorporated into the above-mentioned solution or mixture, as long as the antistatic performance of the film obtained from the solution or mixture, the polymerizability of the synthetic resin substrate-forming starting material and the physical properties of the synthetic resin substrate, are not lowered.

As the means for coating the above-mentioned solution or mixture, there can be mentioned a spray coating method, a flow coating method, a bar coating method, and a dip coating method.

When a plate-shaped methacrylic resin molded article is prepared according to the present invention, from the viewpoint of the productivity, there is preferably adopted a continuous casting process using as a casting mold two confronting stainless steel endless belts each having one mirror-polished surface, which are moved in the same direction at the same speed.

The present invention will now be described in detail with reference to the following examples, that by no means limit the scope of the invention. In the examples, parts are by weight.

All of the electric properties of the samples were determined after they had been moisture-conditioned at a temperature of 20° C. and a relative humidity of 65% for 1 day. The charge half-value time was measured under conditions of an applied voltage of 10,000 V, a sample-rotating speed of 1,550 rpm, a voltage application time of 30 seconds, a measurement temperature of 20° C., and a measurement relative humidity of 65%. The voltage of the sample at the application of the voltage was designated as the initial voltage (V), and the time required for the voltage of the sample to fall from the initial voltage to $\frac{1}{2}$ thereof was designated as the charge half-value time (sec). The surface resistivity (0) after 1 minute from the point of application of a voltage of 500 V was measured at a measurement temperature of 20° C. and a measurement relative humidity of 65%, as the surface resistivity by a high megohm meter (Model TR-8601 supplied by Takeda Riken).

The surface resistivity after water washing was measured by the above-mentioned high megohm meter after the obtained plate had been cut into a test piece having a size of 40 mm × 40 mm, and the test piece had been strongly wiped 60 times with a gauze in running water.

The surface hardness was determined according to the pencil scratch test of JIS K-5400 (usual test methods for paints).

The transparency was evaluated based on the haze value by using an integrating sphere haze meter (Model SEP-H-SS supplied by Nippon Seimitsu Kogaku).

EXAMPLE 1

A glass flask equipped with stirring vanes was charged with 312.4 parts of 2-acrylamido-2-methylpropanesulfonic acid and 450 parts of methanol, and 550.3 parts of a 25% by weight solution of tetramethylammonium hydroxide in methanol was added dropwise with violent stirring so that the temperature was held below 30° C. After the dropping, the mixture was stirred for 30 minutes to obtain an anionic monomer (M-1), then, 4 parts of azobisisobutyronitrile, 3 parts of n-octylmercaptan, 38 parts of methanol, and 423 parts of polyethylene glycol(23) monomethacrylate monomethyl ether were added to the obtained anionic monomer (M-1) solution, and polymerization was carried out at 60° C. for 4 hours in a nitrogen atmosphere. The reaction product was then vacuum-dried to obtain an antistatic polymer (P-1).

Then, 5 parts of the polymer (P-1) were dissolved in 95 parts of ethanol to prepare a film-forming starting material. On a mirror-polished surface of a stainless steel plate having a length of 600 mm, a width of 450 mm and a thickness of 3 mm, the film-forming starting material was spray-coated and dried. By using a pair of the thus-treated stainless steel plate and gaskets, a casting mold was constructed so that the thickness of the cast product was 3 mm. A synthetic resin-forming starting material prepared by dissolving 0.05 part of 2,2'-azobisisobutyronitrile in 100 parts of partially polymerized methyl methacrylate having a viscosity of 1,000 cP as determined at 20° C. and a polymerization conversion of 20%, and removing dissolved air under a reduced pressure, was cast into the casting mold, and polymerization was carried out at 60° C. for 10 hours and further at 110° C. for 4 hours. Then, the temperature was lowered to the normal temperature, and the molded product was parted from the casting mold.

The surface resistivity of the obtained methacrylic resin plate was $9.2 \times 10^{10}$ Ω, the charge half-value time was 1 second, and the haze value was 1.0%. The surface hardness was B as determined according to the pencil scratch test of JIS K-5400.

The obtained plate was washed with water and the antistatic property immediately evaluated, and it was found that the surface resistivity of the obtained methacrylic resin plate was $3.5 \times 10^{10}$ Ω and the charge half-value time was 1 second.

EXAMPLE 2

A glass flask equipped with stirring vanes was charged with 312.4 parts of 2-acrylamido-2-methylpropanesulfonic acid and 450 parts of methanol, and 1042.8 parts of a 40% by weight solution of tetrabutyl phosphonium hydroxide in methanol was added dropwise with violent stirring so that the temperature was held below 30° C. After the dropping, the mixture was stirred for 30 minutes to obtain a solution of an anionic monomer (M-2), and to the obtained anionic monomer (M-2) solution were added 4 parts of azobisisobutyronitrile, 3 parts of n-octylmercaptan, 200 parts of methanol, and 702 parts of polyethylene glycol(23) monomethacrylate monomethyl ether, and polymerization was carried out at 60° C. for 4 hours in a nitrogen atmosphere. The polymerization product was directly vacuum-dried to obtain an antistatic polymer (P-2), and a methacrylic resin plate was prepared in the same manner as described in Example 1 by using the obtained polymer (P-2).

The surface resistivity of the obtained methacrylic resin plate was 4.3 x 1010 0, the charge half-value time was 1 second, and the haze value was 1.0%. The surface hardness was B as determined according to the pencil scratch test of JIS K-5400.

The obtained plate was washed with water and the antistatic property immediately evaluated, and it was found that the surface resistivity was $9.5 \times 10^{10}$ Ω and the charge half-value time was 1 second.

EXAMPLE 3

A glass flask equipped with stirring vanes was charged with 156.7 parts of 2-acrylamido-2-methylpropanesulfonic acid and 220 parts of methanol, and 276.1 parts of a 25% by weight solution of tetramethylammonium hydroxide in methanol was added dropwise with violent stirring so that the temperature was held below 30° C. After the dropping, the mixture was stirred for 30 minutes to obtain a solution of an anionic monomer (M-1), and to the obtained anionic monomer (M-1) solution were added 3 parts of azobisisobutyronitrile, 2 parts of n-octylmercaptan, 80 parts of methanol, 283 parts of polyethylene glycol(23) monomethacrylate monomethyl ether, 212 parts of methyl methacrylate and 18 parts of allyl methacrylate, and polymerization was carried out at 60° C. for 5 hours in a nitrogen atmosphere to obtain a solution of an antistatic polymer (P-3). Then a methacrylic resin plate was prepared in the same manner as described in Example 1 by using the obtained polymer (P-3).

The surface resistivity of the obtained methacrylic resin plate was $5.8 \times 10^{10}$ Ω, the charge half-value time was shorter than 1 second, and the haze value was 1.0%. The surface hardness was 3H as determined according to the pencil scratch test of JIS K-5400.

The obtained plate was washed with water and the antistatic property immediately evaluated, and it was found that the surface resistivity was $4.3 \times 10^{10}$ Ω and the charge half-value time was shorter than 1 second.

EXAMPLE 4

A glass flask equipped with stirring vanes was charged with 156.7 parts of 2-acrylamido-2-methylpropanesulfonic acid and 220 parts of methanol, and 523.1 parts of a 40% by weight solution of tetrabutylphosphonium hydroxide in methanol was added dropwise with stirring so that the temperature was held below 30 minutes, to obtain a solution of an anionic monomer (M-2), and to the obtained anionic monomer (M-2) solution were added 3 parts of azobisisobutyronitrile, 2 parts of n-octylmercaptan, 80 parts of methanol, 470 parts of polyethylene glycol(23) monomethacrylate monomethyl ether, 352 parts of methyl methacrylate and 35 parts of allyl methacrylate, and polymerization was carried out at 60° C. for 5 hours in a nitrogen atmosphere to obtain a solution of an antistatic polymer (P-4). A methacrylic resin plate was prepared in the same manner as described in Example 1 by using the obtained polymer (P-4).

The surface resistivity of the obtained methacrylic resin plate was $6.3 \times 10^{10}$ Ω, the charge half-value time was 1 second, and the haze value was 1.0%. The surface hardness was 3H as determined according to the pencil scratch test of JIS K-5400.

The obtained plate was washed with water and the antistatic property immediately evaluated, and it was found that the surface resistivity was $6.5 \times 10^{10}$ Ω and the charge half-value time was 1 second.

COMPARATIVE EXAMPLE 1

A methacrylic resin plate having a thickness of 3 mm was prepared in the same manner as described in Example 1, except that a mirror-polished stainless steel plate not treated with the antistatic polymer was used.

The surface resistivity of the plate was higher than $10^{16}$ Ω, the charge half-value time was longer than 120 seconds, the haze value was 1.0%, and the surface hardness was 3H.

EXAMPLE 5

A methacrylic resin plate having a thickness of 3 mm was prepared in the same manner as described in Example 1 except that tempered glass sheets having a length of 600 mm, a width of 450 mm, and a thickness of 6 mm was used as the casting mold. The surface resistivity of the obtained resin plate was $7.8 \times 10^{9}$ Ω, the charge half-value was 1 second, the haze value was 1.0%, and the surface hardness was HB.

After the water washing, the surface resistivity was $2.3 \times 10^{10}$ Ω and the charge half-value time was 1 second.

EXAMPLE 6

A laminate formed by bonding a polyester film (Lumilar supplied by Toray; standard type having a thickness of 250 μm) to the surface of a stainless steel plate having a length of 600 mm, a width of 450 mm, and a thickness of 3 mm was used as the casting mold, and a methacrylic resin plate having a thickness of 3 mm was prepared in the same manner as described in Example 1. The surface resistivity of the obtained resin plate was $7.2 \times 10^{9}$ Ω, the charge half-value time was 1 second, and the surface hardness was B.

After the water washing, the surface resistivity was $5.6 \times 10^{10}$ Ω and the charge half-value time was 1 second.

EXAMPLE 7

A methacrylic resin plate having a thickness of 3 mm was prepared in the same manner as described in Example 1, except that a mixture of 2.0 parts of polymer (P-1), 51.0 parts of methyl methacrylate and 47.0 parts of partially polymerized methyl methacrylate having a viscosity of 100 cP and a polymerization conversion of 8% was coated as the film-forming starting material on the casting mold by a bar coater. The surface resistivity of the obtained resin plate had a surface resistivity of $2.3 \times 10^{10}$ Ω a charge half-value shorter than 1 second and a haze value of 1.0%. The surface hardness was H as determined according to the pencil scratch test of JIS K-5400.

After the water washing, the surface resistivity was $2.5 \times 10^{10}$ Ω and the charge half-value time was shorter than 1 second.

EXAMPLE 8

A methacrylic resin plate was prepared in the same manner as described in Example 2 except that 5 parts of ethylene glycol dimethacrylate was used instead of allyl methacrylate. The surface resistivity of the obtained resin plate was $5.3 \times 10^{10}$ Ω, the charge half-value time was shorter than 1 second, and the haze value was 1.0%.

After the water washing, the surface resistivity was $6.4 \times 10^{10}$ Ω and the charge half-value time was shorter than shorter than 1 second. The surface hardness was 3H as determined according to the pencil scratch test of JIS K-5400.

EXAMPLES 9 THROUGH 15

Polymers (P-5) through (P-11) shown in Table 2 were prepared in the same manner as described in Example 1, by using the monomer (M-1) solution. Methacrylic resin plates having a thickness of 3 mm were prepared in the same manner as described in Example 1, by using these polymers. The evaluation results are shown in Table 2.

In Examples 9, 10 and 15, monomeric methyl methacrylate was used instead of the partially polymerized methyl methacrylate as the substrate resin-forming starting material.

In Examples 9 and 15, the parting from the casting mold was very difficult.

EXAMPLES 16 THROUGH 21

Monomers were prepared in the same manner as described in Example 1 or 2 except that a sulfonic acid-containing monomer shown in Table 1 and a quaternary ammonium base or quaternary phosphonium base shown in Table 1 were used.

TABLE 1

| Monomer | Sulfonic Acid-Containing Monomer | Quaternary Base |
|---|---|---|
| M-3 | Allylsulfonic acid | Tetramethylammonium hydroxide |
| M-4 | Sulfoethyl methacrylate | Lauryltrimethylammonium hydroxide |
| M-5 | Styrenesulfonic acid | Benzyltrimethylammonium hydroxide |
| M-6 | Allylsulfonic acid | Tetraethylphosphonium hydroxide |
| M-7 | Sulfoethyl methacrylate | Benzyltriethylphosphonium hydroxide |
| M-8 | Styrenesulfonic acid | Tetrabutylphosphonium hydroxide |

Polymers (P-12) through (P-17) shown in Table 2 were prepared in the same manner as described in Example 1 or 2, by using solutions of monomers (M-3) through (M-8) shown in Table 1.

Methacrylic resin plates having a thickness of 3 mm were prepared in the same manner as described in Example 1 by using these copolymers. The evaluation results are shown in Table 2.

EXAMPLE 22

An apparatus for the continuous production of a methacrylic resin plate as shown in the accompanying drawing was used as the casting mold.

Referring to the accompanying figure, belts 1 and 1' are endless stainless steel belts having a mirror-polished surface, a width of 1.5 m and a thickness of 1 mm. The belts were moved at a speed of 2 m/min by driving a main pulley 2'. The initial tension on the belts was given by hydraulic cylinders arranged on pulleys 2 and 2' and set at 10 kg/mm$^2$ of the sectional area of the belts. Also reference numerals 3 and 3' represent pulleys.

Film-forming starting materials 5 and 5' comprising 2.0% by weight of copolymer (P-3), 96.0% by weight of methyl methacrylate and 2.0% by weight of methanol were coated on the mirror-polished surfaces of belts 1 and 1' by roll coaters 6 and 6'.

The film-formed belts were arranged to confront each other, and both side portions thereof were sealed by hollow pipe gaskets 15 of polyvinyl chloride charged with a considerable amount of a plastizier. A synthetic resin substrate-forming starting material 14 comprising 100 parts of partially polymerized methyl methacrylate (the content of a polymer having an average degree of polymerization of 1,800 was 21%), 0.05 part of 2,2'-azobis(2,4-dimethylvaleronitrile) and 0.01 part of Tinuvin P was supplied between the belts through a casting device by a metering pump.

The total length of the polymerization zone was 96 m. In the former part having a length of 66 m, the distance between the confronting surfaces of the belts was controlled by a plurality of idle rollers 4 and 4' arranged at intervals of 15 cm and warm water maintained at 80° C. was spray-scattered on the outer surfaces of the belts. In the latter part having a length of 30 m, the belts were supported by idle rollers arranged at intervals of 1 m, and the cast material was heated at about 130° C. by an infrared heater and then cooled. After the cooling, the product was peeled from the belts, and thus a methacrylic resin plate having a thickness of 3 mm was continuously prepared.

The surface resistivity of the obtained resin plate was $2.0 \times 10^{10}$ Ω, the charge half-value time was shorter than 1 second, and the haze value was 1.0%. The surface hardness was 3H as determined according to the pencil scratch test method of JIS K-5400.

After the water washing, the surface resistivity was $1.3 \times 10^{10}$ Ω, and the charge half-value time was shorter than 1 second.

COMPARATIVE EXAMPLES 2 AND 3

Polymers (P-18) and (P-19) shown in Table 2 were prepared in the same manner as described in Example 1, by using the solution of monomer (M-1). Methacrylic resin plates having a thickness of 3 mm were prepared in the same manner as described in Example 1 by using these polymers. The evaluation results are shown in Table 2.

COMPARATIVE EXAMPLE 4

A methacrylic resin plate having a thickness of 3 mm was prepared in the same manner as described in Example 1, except that a 10% by weight solution of a coating type antistatic agent having a quaternary ammonium base (Statiside supplied by Analytical Chemical Laboratories) in methanol was used as the film-forming starting material.

The surface resistivity of the obtained resin plate was $1.6 \times 10^{9}$ Ω and the half-value time was shorter than 1 second, but many fine undulation defects were formed on the surface of the resin plate by a partial peeling from the surface of the casting mold during the polymerization.

COMPARATIVE EXAMPLE 5

A glass flask equipped with stirring vanes was charged with 312.4 parts of 2-acrylamido-2-methylpropanesulfonic acid and 450 parts of methanol, and a mixture of 102.8 parts of 25% by weight aqueous ammonia and 240 parts of methanol was added dropwise with violent stirring so that the temperature was held below 30° C. The mixture was stirred for 30 minutes to obtain an anionic monomer (M-9) solution, and to the obtained anionic monomer (M-9) solution were added 3.2 parts of azobisisobutyronitrile, 2.4 parts of n-octyl-mercaptan, 30 parts of methanol and 360 parts of polyethylene glycol(23) monomethacrylate monomethyl ether, and polymerization was carried out at 60° C. for 4 hours in a nitrogen atmosphere. After the polymerization, the polymerization product was directly dried in vacuo to obtain an antistatic polymer (P-18).

A methacrylic resin plate was prepared in the same manner as described in Example 1 by using the obtained polymer (P-18). Parting of the plate from the stainless steel plate as the casting mold was not good, and a peeling phenomenon in which the antistatic polymer was left on the stainless steel plate was observed, and the surface of the methacrylic resin plate was slightly yellowed.

From the results of Comparative Example 5, it is seen that if counter cations $R_2$ through $R_5$ in general formula (I) are hydrogen atoms, the compatibility with the resin and the resistance against thermal deterioration are lowered.

We claim:

1. A synthetic resin molded article having a good antistatic property, which comprises a synthetic resin substrate and a film of an antistatic polymer formed on the surface of the synthetic resin substrate, said antistatic polymer being prepared by polymerizing an anionic monomer represented by the following general formula (I) or a mixture comprising at least 20% by weight of said anionic monomer and up to 80% by weight of at least one monomer copolymerizable therewith:

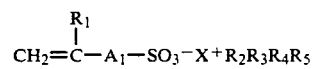

wherein $R_1$ represents a hydrogen atom or a methyl group, $A_1$ represents

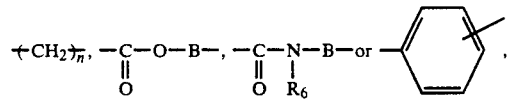

X represents a nitrogen atom or a phosphorus atom, $R_2$, $R_3$, $R_4$ and $R_5$ independently represent an alkyl, aryl or aralkyl group having 1 to 18 carbon atoms which may have a substituent, n is 0, 1 or 2, B represents an alkylene, arylene or aralkylene group having 1 to 18 carbon atoms which may have an ester bond, and $R_6$ represents a hydrogen atom or an alkyl group having 1 to 5 carbon atoms.

2. A synthetic molded article according to claim 1, wherein X in the general formula (I) is a nitrogen atom.

3. A synthetic resin molded article according to claim 1, wherein the starting material of the synthetic resin substrate is methyl methacrylate or a monomer mixture comprising at least 50% by weight of methyl methacrylate and up to 50% by weight of at least one monomer copolymerizable therewith, or a partial polymerization product thereof.

4. A synthetic resin molded article according to claim 1, wherein the copolmerizable monomer is selected from the group consisting of compounds represented by the following general formula (II):

TABLE 2

| | Polymer | Monomers | | | | | | Surface resistivity ($\Omega$) | Surface resistivity after water washing ($\Omega$) | Haze value ($\Omega$) |
| --- | --- | --- | --- | --- | --- | --- | --- | --- | --- | --- |
| | | Kind | Amount (parts) | Kind | Amount (parts) | Kind | Amount (parts) | | | |
| Example 9 | P-5 | M-1 | 100 | — | — | — | — | $1.5 \times 10^{10}$ | $3.6 \times 10^{12}$ | 1.2 |
| Example 10 | P-6 | M-1 | 80 | PEG(23) | 20 | — | — | $1.3 \times 10^{10}$ | $2.2 \times 10^{11}$ | 1.0 |
| Example 11 | P-7 | M-1 | 20 | PEG(23) | 40 | Methyl methacrylate | 40 | $5.3 \times 10^{11}$ | $5.1 \times 10^{11}$ | 1.0 |
| Example 12 | P-8 | M-1 | 50 | PEG(9) | 50 | — | — | $2.3 \times 10^{11}$ | $8.5 \times 10^{11}$ | 1.0 |
| Example 13 | P-9 | M-1 | 50 | PEG(500) | 50 | — | — | $5.3 \times 10^{10}$ | $9.8 \times 10^{10}$ | 1.0 |
| Example 14 | P-10 | M-1 | 30 | PEG(23) | 40 | Methyl acrylate | 30 | $3.8 \times 10^{10}$ | $4.5 \times 10^{10}$ | 1.0 |
| Example 15 | P-11 | M-1 | 50 | Methyl methacrylate | 50 | — | — | $1.2 \times 10^{11}$ | $9.8 \times 10^{10}$ | 1.0 |
| Example 16 | P-12 | M-3 | 50 | PEG(23) | 50 | — | — | $2.5 \times 10^{11}$ | $7.3 \times 10^{11}$ | 1.0 |
| Example 17 | P-13 | M-4 | 50 | PEG(23) | 50 | — | — | $3.8 \times 10^{11}$ | $9.1 \times 10^{11}$ | 1.0 |
| Example 18 | P-14 | M-5 | 50 | PEG(23) | 50 | — | — | $7.3 \times 10^{10}$ | $3.6 \times 10^{11}$ | 1.0 |
| Example 19 | P-15 | M-6 | 50 | PEG(23) | 50 | — | — | $1.5 \times 10^{10}$ | $8.5 \times 10^{10}$ | 1.0 |
| Example 20 | P-16 | M-7 | 50 | PEG(23) | 50 | — | — | $8.7 \times 10^{10}$ | $2.2 \times 10^{11}$ | 1.0 |
| Example 21 | P-17 | M-8 | 50 | PEG(23) | 50 | — | — | $2.1 \times 10^{10}$ | $5.3 \times 10^{10}$ | 1.0 |
| Comparative Example 2 | P-18 | M-1 | 10 | PEG(23) | 90 | — | — | $5.3 \times 10^{14}$ | $9.3 \times 10^{14}$ | 1.0 |
| Comparative Example 3 | P-19 | M-1 | 10 | PEG(23) | 10 | Methyl methacrylate | 80 | $8.9 \times 10^{14}$ | $1.3 \times 10^{15}$ | 1.0 |

Note
PEG(23): polyethylene glycol(23) monomethacrylate monomethyl ether
PEG(9): polyethylene glycol(9) monomethacrylate monomethyl ether
PEG(500): polyethylene glycol(500) monomethacrylate monomethyl ether
Note, each parenthesized value indicates the number of alkylene glycol units in the polyalkylene glycol.

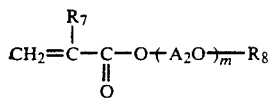

wherein $R_7$ represents a hydrogen atom or a methyl group, $R_8$ represents a hydrogen atom or an alkyl, aralkyl or aryl group having 1 to 18 carbon atoms, which has no copolymerizable functional group, $A_2$ represents an alkylene group having 2 to 4 carbon atoms, and m is an integer of from 0 to 500, and copolymerizable compounds having at least two unsaturated double bonds.

5. A synthetic resin molded article according to claim 4, wherein m in the general formula (II) is an integer of from 2 to 500.

6. A synthetic resin molded article having a good antistatic property, which is prepared by the process which comprises the steps of:

forming on the molding surface of casting mold a film of an antistatic polymer by polymerizing an anionic monomer represented by the following general formula (I) or a mixture comprising at least 20% by weight of said anionic monomer and up to 80% by weight of at lest one monomer copolymerizable therewith:

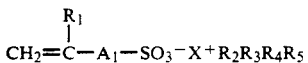

wherein $R_1$ represents a hydrogen atom or a methyl group, $A_1$ represents

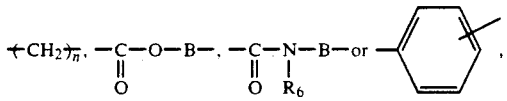

X represents a nitrogen atom or a phosphorus atom, $R_2$, $R_3$, $R_4$ and $R_5$ independently represent an alkylene, arylene or aralkylene group having 1 to 18 carbon atoms which may have a substituent, n is 0, 1 or 2, B represents an alkylene, arylene or aralkylene group having 1 to 18 carbon atoms which may have an ester bond, and $R_6$ represents a hydrogen atom or an alkyl group having 1 to 5 carbon atoms;

casting a starting material of a synthetic resin as the substrate into the casting mold;

polymerizing said starting material to transfer said film to the surface of the substrate; and withdrawing the obtained molded article from the casting mold.

7. A synthetic molded article according to claim 6, wherein X in the general formula (I) is a nitrogen atom.

8. A synthetic resin molded article according to claim 6, wherein the starting material of the synthetic resin substrate is methylmethacrylate or a monomer mixture comprising at least 50% by weight of methyl methacrylate and up to 50% by weight of at least one monomer copolymerizable therewith, or a partial polymerization product thereof.

9. A synthetic resin molded article according to claim 6, wherein the copolymerizable monomer is selected from the group consisting of compounds represented by the following general formula (II):

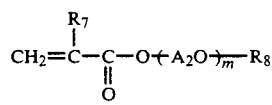

wherein $R_7$ represents a hydrogen atom or a methyl group, $R_8$ represents a hydrogen atom or an alkyl, aralkyl or aryl group having 1 to 18 carbon atoms, which has no copolymerizable functional group, $A_2$ represents an alkylene group having 2 to 4 carbon atoms, and m is an integer of from 0 to 500, and copolymerizable compounds having at least two unsaturated double bonds.

10. A synthetic resin molded article according to claim 9, wherein m in the general formula (II) is an integer of from 2 to 500.

* * * * *